Figure 1:
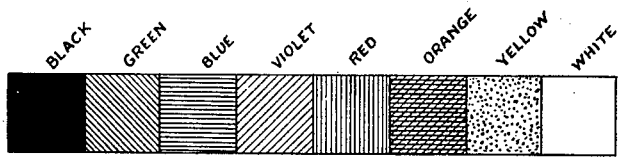

May 23, 1933.　　　　M. MARTINEZ　　　　1,910,117

COLOR PHOTOGRAPHY

Filed July 19, 1929

Patented May 23, 1933

1,910,117

UNITED STATES PATENT OFFICE

MICHELE MARTINEZ, OF LONDON, ENGLAND, ASSIGNOR TO A. H. JOHNSON & CO. (PAPER) LIMITED, OF LONDON, ENGLAND

COLOR-PHOTOGRAPHY

Application filed July 19, 1929, Serial No. 379,472, and in Great Britain September 6, 1928.

One object of this invention is to supply a photographically sensitive surface which will yield a picture in one color or another color in accordance with the wave length of the incident light, so that either of two colors, or any one of several colors, or two or more than two colors, can be produced on the same surface. In this statement black is to be regarded as a color.

Another object is to provide means for direct color photography.

What I may call the foundation of my invention is the work which I have done in connection with the use of certain derivatives of the urea group, of which alloxan may be taken as a type, in producing a red color by action of light. The production with aid of these derivatives of a red image for superimposing in the well-known three color system has been described in my British Patent No. 280,252. The sensitive surface for red there specifically prescribed contains alloxan, ferric chloride, ferric oxalate and mercuric chloride. Such a surface yields a red color when exposed to light, due to a change which occurs in alloxan under action of light, the ferric salts and the mercuric chloride having been found to act as sensitizer and as improving the permanence of the color.

The new observation that the color change in red alloxan is also produced by red light, at once suggested the achievement of the object set forth in the first paragraph hereof. For since compounds are known which yield, directly or by development, for instance blue when exposed to blue rays, but are substantially insensitive to red rays, it should be possible by preparing a material with both alloxan and such a compound to provide a surface which will yield exclusively a red color under red light, exclusively a violet (mixture of blue and red) under blue light and both colors when at one part the exposure is to blue light and at another part to red light.

It would seem that the lack of bodies which are changed with production of a red color when exposed to red rays has been the chief stumbling block to direct color photography, so that I may be said to make possible by my invention this long-desired object.

Broadly speaking, therefore, my invention consists in a surface sensitive to light comprising alloxan or its equivalent and at least one substance which will yield at least one color other than red under the action of light.

Equivalents of alloxan for the purpose of my invention are bodies which yield a red color when exposed to red light; alloxantine, alloxanic acid and murexide are more or less satisfactory equivalents, but special importance attaches to the compounds dimethylglyoxime and α-benzil-dioxime when used in the form of a nickel salt or in conjunction with a nickel salt and in presence of a ferric salt or oxalic acid or an oxalate, or both oxalic acid and an oxalate. The red color of the nickel derivatives of these oximes is suppressed by the above compounds, but is developed again by the action of light.

A further observation which I have made and which is of much importance to my invention is that when alloxan or its equivalent is used in conjunction with an excess of a photosensitive ferric salt in a photographic surface of a blue color (due to a reaction of alloxan with the ferrous salt formed by action of light) is produced in the surface by action of white, blue or violet rays to the substantial suppression of the red due to alloxan, but not under the action of red rays, which produce the red due to alloxan. Hence a surface containing only an organic ferric salt and alloxan will yield a more or less true blue and a red when exposed at different parts thereof to blue rays and to red rays. By excess is here meant a quantity exceeding that of the alloxan; in British Patent No. 280,252 the proportion of ferric salt to alloxan in the prescription is not sufficient to produce a blue image with the alloxan.

For instance 3 grammes of alloxan and 6 grammes of ferric ammonium citrate or ferric ammonium oxalate (representing at least 56 parts of the element iron per 284 parts of alloxan) dissolved in 100 cc. of water will yield a blue image under the action of blue rays or of light wherein the blue rays predominate.

It is known that an organic salt of mercury, especially a mercury oxalate (or a mixture of a mercury salt and an alkali oxalate or oxalic acid) will give a black on exposure to white light or to violet or ultra-violet rays. I have found that the presence of alloxan in quantity not greater than that of the mercuric salt improves the black produced by the mercuric salt and that where this black is produced the alloxan will not give any color reaction. Thus a suitable mixture of alloxan, mercury salt and ferric salt (in presence of alkali oxalate or oxalic acid or both), when exposed at one and the same time at different parts of a surface coated therewith, to white, violet, blue and red rays, will give a blue-black image under the white or ultra-violet rays, a blue one under the blue rays, a violet one under the violet rays and a red one under the red rays. This practically amounts to a negative image so far as black and white are concerned, and a positive image so far as the colored rays are concerned.

A mixture of alloxan and a silver salt will always give directly or by development a yellow image.

The substances named above as equivalent to alloxan may be used instead of the latter.

For example, a surface prepared with an emulsion containing, per 100 cc. 3 grams of alloxan and 5 grams of ferric ammonium oxalate will give on exposure to light a blue image, and if the emulsion contains also 2½ grams of citric or tartaric acid it will be more rapid.

Again, an emulsion containing, per 100 cc. 3 grams of alloxan and 3 grams of silver nitrate will yield a surface which will print out in yellow on prolonged exposure or will be developed in yellow by any of the usual developers after short exposure.

A surface prepared with an emulsion containing all the substances named in the last two preceding paragraphs will give blue, yellow, green and even black under suitable light. The order and distribution of the various colors depend on the proportions of the substances and on the action of the rays prevailing in the incident light.

The sensitive surfaces proposed in accordance with this invention are applicable, as already stated, not only for receiving directly colored rays and recording more or less faithfully the color or colors either by direct change or by change produced by development, but also to the reproduction in a print from a negative, of the color or wave length of the rays which produced the negative.

I will endeavor to explain the principle involved in this part of my invention by reference to the accompanying diagram.

Figure 2:
Figure 3:
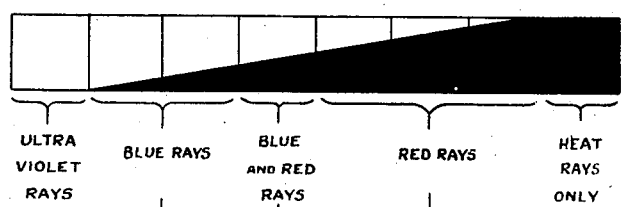
Figure 4:
Figure 5:
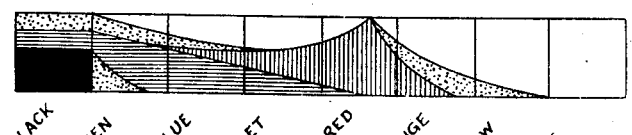

In the drawing, Fig. 1 represents the subject, Figs. 2 and 3 are sections through a negative of Fig. 1, and Figs. 4 and 5 are schematic sections through a positive printed from said negative in accordance with the present invention.

Fig. 1 represents a band colored as indicated. Fig. 2 represents a section through a negative photograph of the band on a panchromatic plate; in daylight it would generally be necessary to interpose a light yellow or orange filter, but with electric light, such as a half-watt incandescent lamp, such screen would not generally be necessary. It will be seen that the quantity of reduced silver (black) in Fig. 2 is graded, there being no silver deposit corresponding with the black, the deposit starting in the green with minimum density and gradually increasing in density through the blue, violet, red, orange and yellow, where it achieves almost maximum density; the greatest density is produced by the white.

The behavior of this negative considered as a filter for the radiation of sunlight, for example, is illustrated in Fig. 3. The silver deposit will absorb the ultra-violet rays almost completely and the blue rays to an extent increasing with the density, while the red rays will pass through the silver at all places except those of maximum density. Heat rays can traverse the whole of the silver deposit.

The result of printing this negative on a sensitive surface made in accordance with this invention may be illustrated in principle (not as representing the true constitution of the picture) by Fig. 4. Here the shading in vertical lines represents red and that in horizontal lines blue. Where the ultra-violet rays are effective black is predominant; where the blue rays preponderate blue is mainly produced, and where red rays are abundant red is produced. The heat rays are without effect in this particular case, so that if the surface is fundamentally white there will be no color at parts beneath those portions of the negative which transmit heat only.

In this instance the picture first produced is lacking yellow, but by an after-treatment the thinnest parts of the red and of the black are changed into yellow so that the final result may be represented by Fig. 5, which should be compared with Fig. 1, the stippled parts of Fig. 5 representing yellow.

The following examples may be given of mixtures which afford suitable sensitive surfaces when emulsified with gelatine in known manner for application as an emulsion:

(1) Water _____ 100 cc.
    Ferric ammonium oxalate ___ 6–8 grams
    Oxalic acid _____ 0.5 grams
(2) Water _____ 100 cc.
    Ferric ammonium citrate ___ 6 grams
    Tartaric acid _____ 1 gram
    Potassium oxalate _____ 2 grams
    Alloxan _____ 2 grams
    Silver nitrate _____ 0.50 gram
(3) A mixture of equal volumes of (1) and (2)
(4) (a) Water _____ 100 cc.
        Ferric ammonium oxalate _____ 5 grams
        Ammonium oxalate ____ 2.5 grams
        Ammonium molybdate __ 2 grams
        Cobalt chloride _____ 1 gram
        Sodium phosphate ____ 0.65 gram
    (b) Water _____ 100 cc.
        Mercuric cyanide ____ 3 grams
        Mercuric sulphate ___ 4 grams
        Urea nitrate _____ 0.75 gram
        Alloxan _____ 3.5 grams
        β-naphthylamine _____ 0.5 gram
        Lead nitrate _____ 1 gram Equal volumes of (a) and (b) are mixed together. Instead of gelatine emulsions, emulsions in gum tragacanth may be used; or the solutions may merely be thickened with sugar, gum arabic or the like.

As an example of the use of the sensitive surface, the surface prepared as prescribed in Example 4 is exposed under a suitable negative to sunlight until a blue image appears. The surface is then heated by exposure to an electric radiator until red and black appear. Instead of this heating operation the exposure to sunlight may be prolonged until the red and black are produced. In either case the surface is then immersed in a developer having the following composition:—

Sodium thiosulphate solution
  (10 per cent strength) _____ 5 cc.
Ammonium carbonate solution (10 per cent strength) _____ 5 cc.
Potassium ferricyanide solution (10 per cent strength) _____ 5 cc.
Water _____ 150 cc.

In this bath the black is fixed but the blue gradually disappears because of the alkalinity. The surface is then transferred to a second bath containing 1–5 per cent. of potassium iodide and a like amount of potassium bromide. Yellow and green will soon appear. The picture is then immersed in water containing a few drops of hydrogen peroxide solution; the blue which had previously been lost now reappears. A final wash with water fixes the picture.

It will be obvious that since by suitable selection of the sensitive compounds used in this invention photographic surfaces can be made which yield an image in one color only, the invention is also applicable for producing color photographs by the three-color process.

It is to be understood that in the claims appended hereto the word "color" includes black.

I claim as my invention:

1. A photographic surface which comprises alloxan and a photosensitive ferric salt in such proportion that there are present at least 56 parts by weight of the element iron for every 284 parts of alloxan.

2. A photographic surface as defined in claim 1 which comprises also a mercuric oxalate in quantity not less than that of the alloxan.

3. A process of color photography, comprising photographically exposing to light a surface which comprises alloxan and a photosensitive ferric salt in such proportion that there are present at least 56 parts by weight of the element iron for every 284 parts of alloxan, and subsequently developing said surface partly by heat.

4. A process of color photography, comprising photographically exposing to light a surface which comprises alloxan and a photosensitive ferric salt in such proportion that there are present at least 56 parts by weight of the element iron for every 284 parts of alloxan and also comprises a mercuric oxalate in quantity less than that of the alloxan, and subsequently developing said surface partly by heat.

In testimony whereof I have signed my name to this specification.

MICHELE MARTINEZ.